US012683059B2

(12) United States Patent
Kumagai et al.

(10) Patent No.: US 12,683,059 B2
(45) Date of Patent: Jul. 14, 2026

(54) COIL DEVICE

(71) Applicant: TDK CORPORATION, Tokyo (JP)

(72) Inventors: Masaru Kumagai, Tokyo (JP); Tomohiro Furuichi, Tokyo (JP); Satoshi Denda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 739 days.

(21) Appl. No.: 18/178,735

(22) Filed: Mar. 6, 2023

(65) Prior Publication Data

US 2023/0290560 A1 Sep. 14, 2023

(30) Foreign Application Priority Data

Mar. 10, 2022 (JP) ................................ 2022-037398

(51) Int. Cl.

*H01F 27/22* (2006.01)
*H01F 27/24* (2006.01)
*H01F 27/32* (2006.01)

(52) U.S. Cl.

CPC ............. *H01F 27/22* (2013.01); *H01F 27/24* (2013.01); *H01F 27/325* (2013.01)

(58) Field of Classification Search

CPC ........ H01F 27/22; H01F 27/24; H01F 27/325; H01F 27/306; H01F 27/025; H01F 27/022; H01F 27/2871; H01F 27/2876; H01F 27/29

USPC ................................................ 336/61, 55–60

See application file for complete search history.

(56) References Cited

U.S. PATENT DOCUMENTS

| | | | | |
|---|---|---|---|---|
| 9,679,692 | B2 | 6/2017 | Yamashima et al. | |
| 2009/0009276 | A1 * | 1/2009 | Jidaisho | H01F 27/027 336/90 |
| 2012/0139684 | A1 * | 6/2012 | Kobayashi | H01F 27/306 336/92 |
| 2015/0170819 | A1 | 6/2015 | Yamashima et al. | |
| 2016/0217916 | A1 * | 7/2016 | Yan | H01F 27/22 |
| 2018/0350512 | A1 * | 12/2018 | Yang | H01F 27/22 |

FOREIGN PATENT DOCUMENTS

JP 2014-036194 A 2/2014

* cited by examiner

*Primary Examiner* — Shawki S Ismail
*Assistant Examiner* — Kazi S Hossain
(74) *Attorney, Agent, or Firm* — Oliff PLC

(57) ABSTRACT

A coil device 1 comprises a second bobbin 20 provided with a second coil 92; cores 30*b* and 30*c* attached to the second bobbin 20; a case 40 accommodating the second bobbin 20 and the cores 30*b* and 30*c*; and a heat dissipating resin 100 filling the case 40. The case 40 comprises a case body 41 covering the second bobbin 20 with the cores 30*b* and 30*c* from above and from below and having an opening 42 that is opened laterally. The second bobbin 20 comprises protrusions 24 protruding from the case body 41 through the opening 42.

10 Claims, 11 Drawing Sheets

COIL DEVICE

TECHNICAL FIELD

The present invention relates to a coil device.

BACKGROUND

Known coil devices used as transformers or so include a coil device provided with a case as disclosed in, for example, Patent Document 1. The case of such a coil device has a function to accommodate a bobbin, a core, etc. ("bobbin, etc.") and, additionally, a function for cooling the bobbin, etc. For example, the case of the coil device disclosed in Patent Document 1 accommodates the bobbin, etc. and is filled with a potting resin so that lower part of the bobbin, etc. is immersed therein. Because the bottom surface of the case is fixed to a foundation having a cooling mechanism, the heat of the bobbin, etc. is transferred from the potting resin to the case and further from the case to the foundation. As a result, the heat of the bobbin, etc. is dissipated outside through the case and so on, which allows the coil device to be cooled.

Unfortunately, upper part of the bobbin, etc. of the coil device disclosed in Patent Document 1 protrudes outside the case through an opening of the case. Thus, it is difficult to transfer the heat of the upper part of the bobbin, etc. to the foundation (having the cooling mechanism). Sufficient heat dissipation ability cannot be achieved at the upper part of the bobbin, etc. This leads to a high temperature of, in particular, the upper part of the bobbin, etc., preventing achievement of high heat dissipation ability of the coil device as a whole.

Also, when a leadout portion of the coil is drawn out from upper part of the bobbin as in the coil device disclosed in Patent Document 1, the upper part of the bobbin is required to protrude outwards from the case for the purpose of positioning the leadout portion, etc. Unfortunately, in this case, the amount of protrusion of the bobbin increases the height of the bobbin, obstructing reduction of the height of the coil device.

Patent Document 1: JP Patent Application Laid Open No. 2014-36194

SUMMARY

The present invention has been achieved under such circumstances. It is an object of the present invention to provide a coil device that has high heat dissipation ability as a whole and can have a reduced height.

To achieve the above object, a coil device according to the present invention comprises a bobbin provided with a coil;

a core attached to the bobbin;

a case accommodating the bobbin and the core; and a heat dissipating resin filling the case;

wherein the case comprises a case body covering the bobbin with the core from above and from below and having an opening that is opened laterally; and the bobbin comprises a protrusion protruding from the case body through the opening.

In the coil device according to the present invention, the case includes the case body that covers, from above and from below, the bobbin having the core attached thereto. Thus, not only lower part of the bobbin and the core ("bobbin, etc."), but also upper part of the bobbin, etc. is covered by the case, and most part of the bobbin, etc. is immersed in the heat dissipating resin filling the case. As a result, not only the heat of the lower part of the bobbin, etc. but also the heat of the upper part thereof is transferred through the heat dissipating resin from upper part to lower part of the case and further from the case (bottom of the case) to the outside (e.g., a cooling mechanism). This increases the heat dissipation ability of the upper part of the bobbin, etc. Unlike the related art, the upper part of the bobbin, etc. does not reach a temperature remarkably higher than the lower part of the bobbin, etc. Consequently, the present invention allows for high heat dissipation ability of the device as a whole, achieving excellent cooling capability of the coil device.

In the coil device according to the present invention, the case includes the case body having the opening, which is opened laterally. Thus, a leadout portion of the coil can be laterally drawn out outwards from the case body through the opening. Unlike the related art, the leadout portion is not drawn out outwards from the case at upper part of the case. Consequently, the upper part of the bobbin is not required to protrude outwards from the case for the purpose of positioning, etc., which can reduce the height of the bobbin by the amount of the eliminated protrusion. By extension, the height of the coil device can be reduced.

In the coil device according to the present invention, the bobbin includes the protrusion protruding from the case body through the opening (opened laterally on the case body). This structure allows the leadout portion drawn out laterally from the case body through the opening to be fixed to (engaged with) the protrusion and further be drawn out (routed) in an intended direction. This can determine the location, the drawing-out direction, etc. of the leadout portion, allowing for sufficiently high lead-out accuracy of the leadout portion.

Preferably, the case body covers the bobbin except at the opening, and the protrusion protrudes in one direction from the case body through the opening. This structure allows the case body to be filled with the heat dissipating resin provided through the opening and to hold the heat dissipating resin securely, because the case is solely provided with the opening. Also, because the protrusion protrudes in one direction from the case body, the coil device can have a smaller size compared to when the protrusion protrudes in a plurality of directions.

Preferably, the protrusion comprises a guide portion that guides the leadout portion of the coil towards a predetermined direction. Drawing out the leadout portion guided by the guide portion towards a predetermined direction outside the case body can determine the drawing-out direction of the leadout portion, allowing for sufficient increase of the lead-out accuracy of the leadout portion.

Preferably, the guide portion comprises a guide path extending in the vicinity of the opening and parallel to a bottom surface of the case. Drawing out the leadout portion along the guide path outside the case body allows the leadout portion to be drawn out in the direction parallel to the bottom surface of the case in the vicinity of the opening. Thus, the leadout portion can be prevented from being drawn out at a location away from the opening. This allows for effective reduction of the size of the coil device.

Preferably, a stopper is attached to the guide portion, and the stopper covers at least part of the guide path from a direction substantially orthogonal to an extending direction of the leadout portion. This structure allows the stopper to prevent lateral misalignment, from the guide path, of the leadout portion drawn out along the guide path (misalignment in the direction substantially orthogonal to the extending direction of the leadout portion), preventing the leadout portion from falling off the guide path.

Preferably, the guide portion made separately from the bobbin is attached to the protrusion. This structure allows for simplification of the bobbin. This structure also allows the guide portion to be attached to the protrusion after the coil is provided for the bobbin, preventing the guide portion from obstructing provision of the coil for the bobbin.

Preferably, the coil comprises a first coil including a first wire and a second coil including a second wire; the bobbin comprises a first bobbin provided with the first coil and a second bobbin provided with the second coil; the first bobbin comprises a first protrusion protruding from the case body through the opening; and the second bobbin comprises a second protrusion protruding from the case body through the opening. Providing the first coil and the second coil for the different bobbins (the first bobbin and the second bobbin) allows the magnetic properties of the coil device to be adjusted in accordance with, for example, the distance between the bobbins. Providing the protrusion for each bobbin allows the leadout portion of the coil of each bobbin to be drawn out (routed) in an intended direction with high accuracy while the leadout portion is fixed to the protrusion.

Preferably, the coil comprises a flat coil having a flat wire, and a leadout portion of the flat coil protrudes from the case body through the opening and is fixed to the protrusion. Constituting the coil with a conductive member having a flat shape allows a relatively large current to be applied to the flat coil. Fixing the leadout portion of the flat coil to the protrusion can prevent misalignment of the flat coil.

BRIEF DESCRIPTION OF THE DRAWING(S)

DETAILED DESCRIPTION

Figure 1A:
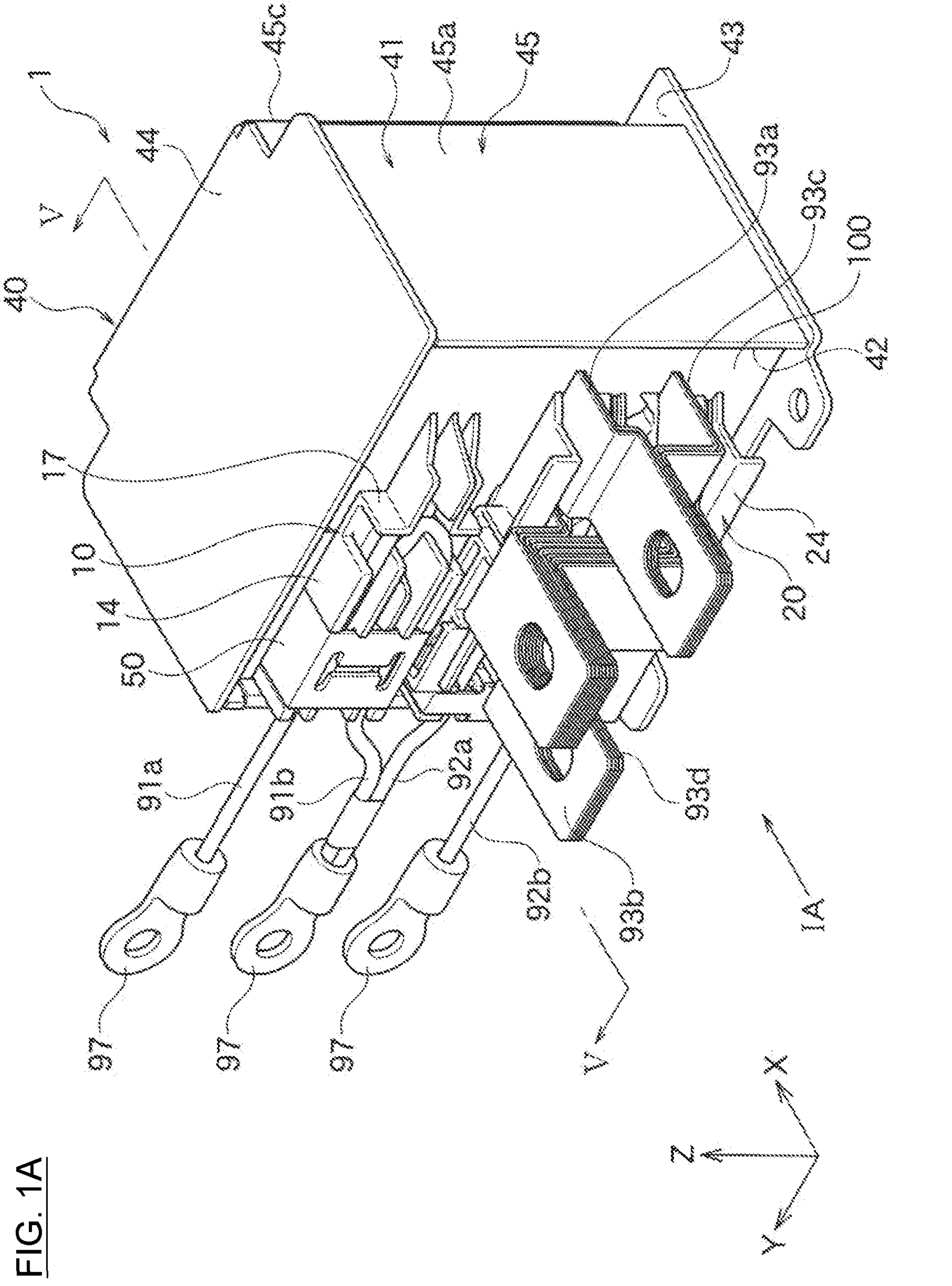
FIG. 1A is a perspective view of a coil device according to an embodiment of the present invention.

Hereinafter, the present invention will be explained based on an embodiment shown in the drawings.

A coil device 1 of the present embodiment shown in FIG. 1A functions as, for example, a transformer. The coil device 1 is used in an on-board charger, a power supply circuit of electronic equipment for home or industrial use, a power supply circuit of computer equipment, etc. In the drawings, the positive direction of the Z-axis is the upward direction, the negative direction of the Z-axis is the downward direction, and the direction orthogonal to the Z-axis is the lateral direction. The direction towards a center of the coil device 1 is the inward direction, and the direction away from the center of the coil device 1 is the outward direction.

Figure 2:
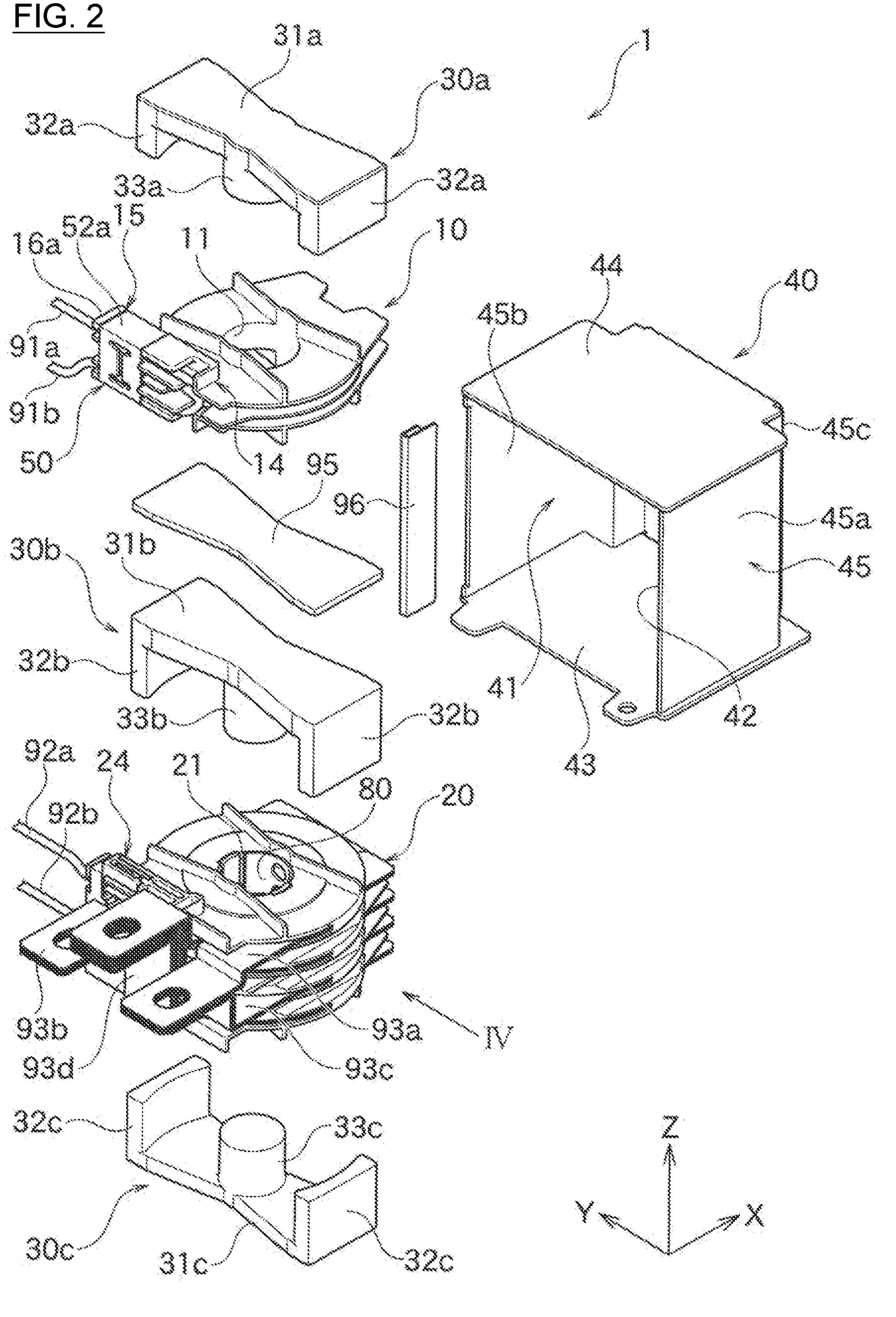
FIG. 2 is an exploded perspective view of the coil device shown in FIG. 1A.

As shown in FIG. 2, the coil device 1 includes a first bobbin 10, a second bobbin 20, cores 30*a* to 30*c*, a case 40, a first coil 91 (FIG. 7), a second coil 92 (FIG. 7), and flat coils 93*a* to 93*d*. The coil device 1 is a vertical type coil device. The axial direction (Z-axis direction) of the first bobbin 10 and the second bobbin 20 corresponds to the direction orthogonal to a mounting substrate (mounting surface) not shown in the drawings. The mounting substrate is disposed under the case 40.

The first coil 91 (FIG. 7) constitutes, for example, an inductor. The second coil 92 constitutes a primary coil (or a secondary coil) of the transformer. The flat coils 93*a* to 93*d* (FIG. 3) constitute the secondary coil (or the primary coil) of the transformer. Note that the first coil 91 may be omitted.

The first coil 91 and the second coil 92 are each made of a film insulated wire, which is a core wire (e.g., a copper wire) covered by an insulating film. Preferably, each of the wires of the first coil 91 and the second coil 92 has a diameter of 1.0 to 3.0 mm. The diameters of the wires may be the same or different.

As shown in FIG. 1A, a terminal 97 is attached to a leadout portion 91*a* of the first coil 91. The same applies to a leadout portion 92*b* of the second coil 92. Another terminal 97 is attached to a leadout portion 91*b* of the first coil 91 and a leadout portion 92*a* of the second coil 92 so as to bind these leadout portions. The first coil 91 and the second coil 92 are electrically connected via the leadout portions 91*b* and 92*a*.

Figure 3:
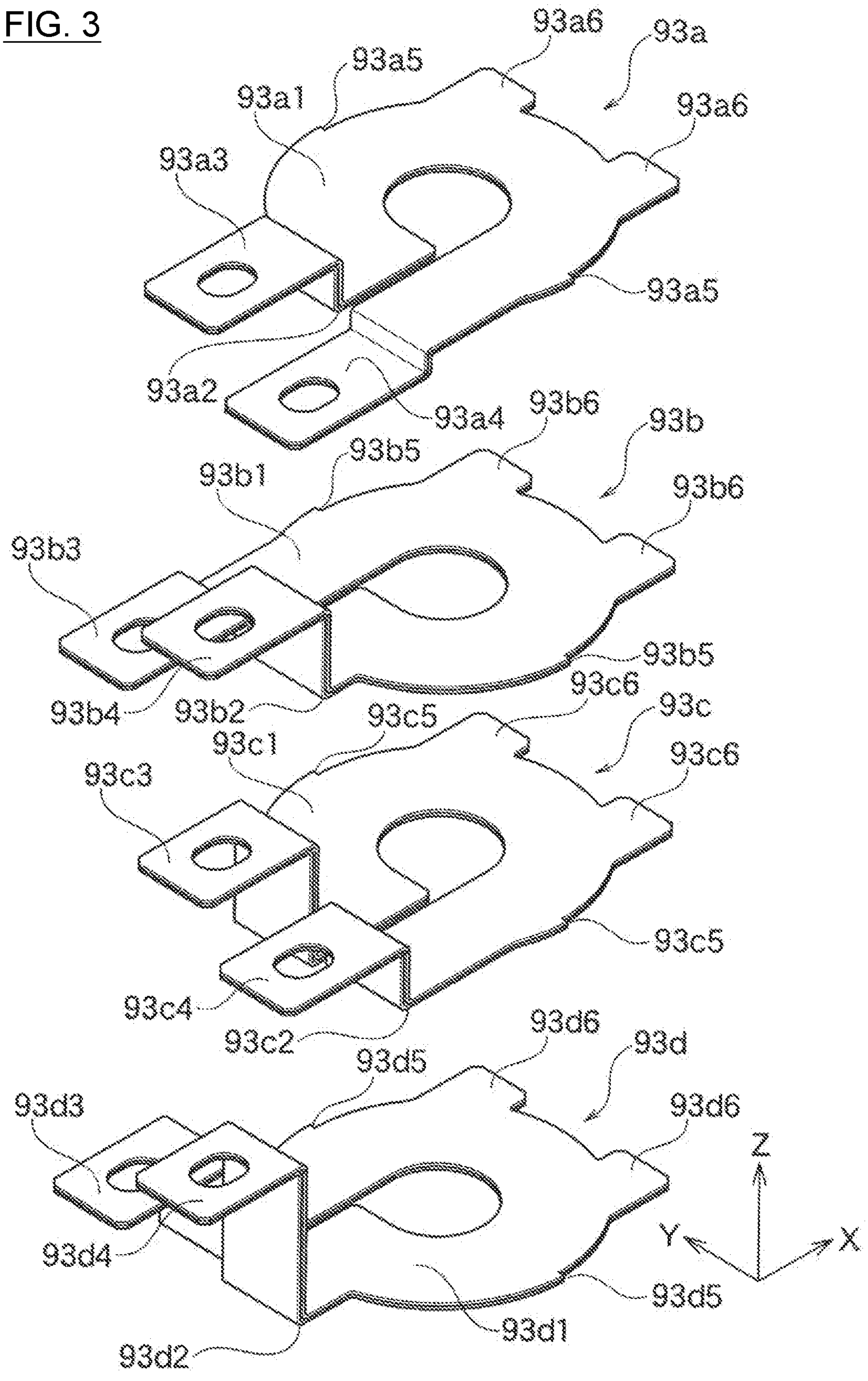
FIG. 3 is a perspective view of flat coils shown in FIG. 1A.

As shown in FIG. 3, each of the flat coils 93*a* to 93*d* has a substantially ring shape and is made of a conductor (e.g., sheet copper) having a flat shape. A relatively large current can be applied to the flat coils 93*a* to 93*d*. The flat coil 93*a* has a two-layer structure including two sheets, namely a sheet 93*a*1 and a sheet 93*a*2, to reduce AC resistance. Similarly, the flat coil 93*b* has a two-layer structure including two sheets, namely a sheet 93*b*1 and a sheet 93*b*2; the flat coil 93*c* has a two-layer structure including two sheets, namely a sheet 93*c*1 and a sheet 93*c*2; and the flat coil 93*d* has a two-layer structure including two sheets, namely a sheet 93*d*1 and a sheet 93*d*2. Note that a spacer (not shown in the drawings) may be disposed between the two sheets of each pair.

The flat coil 93*a* includes leadout portions 93*a*3, leadout portions 93*a*4, projecting portions 93*a*5, and protruding end portions 93*a*6. The flat coil 93*b* includes leadout portions 93*b*3, leadout portions 93*b*4, projecting portions 93*b*5, and protruding end portions 93*b*6. The flat coil 93*c* includes leadout portions 93*c*3, leadout portions 93*c*4, projecting portions 93*c*5, and protruding end portions 93*c*6. The flat coil 93*d* includes leadout portions 93*d*3, leadout portions 93*d*4, projecting portions 93*d*5, and protruding end portions 93*d*6.

Figure 4:
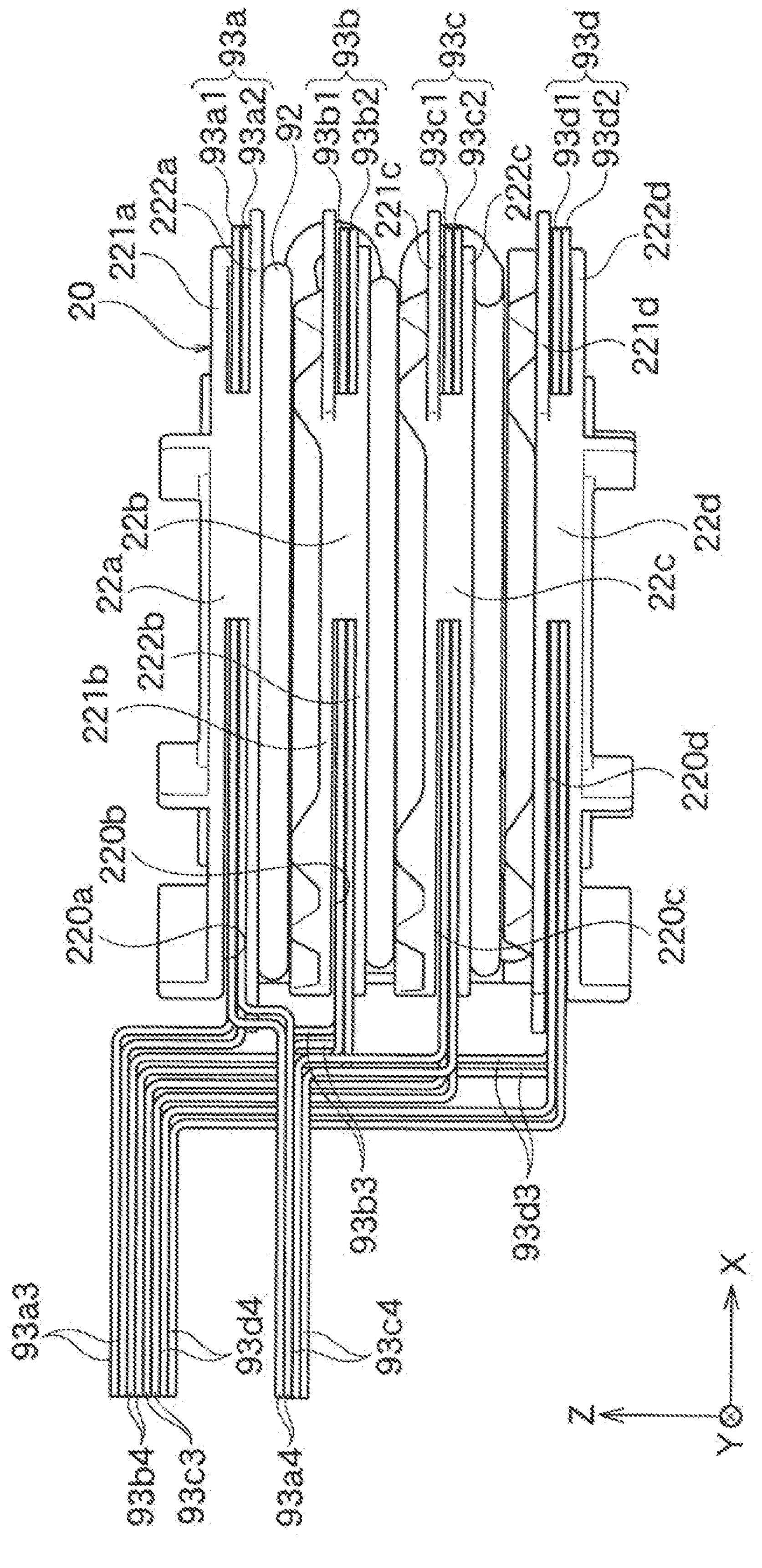
FIG. 4 is a side elevational view of a second bobbin shown in FIG. 2 viewed from direction IV.
Figure 5:
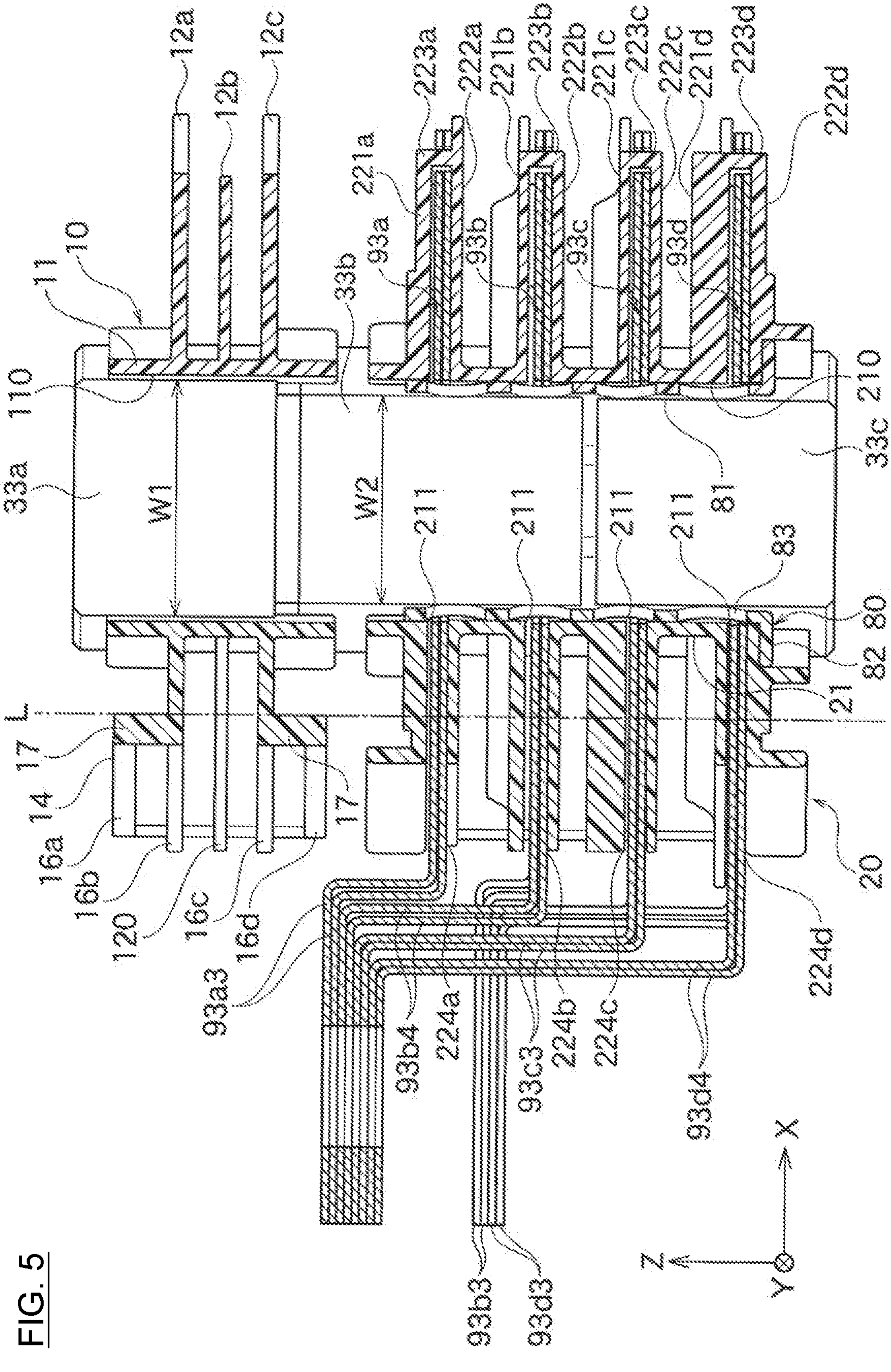
FIG. 5 is a sectional view along line V-V shown in FIG. 1A.

As shown in FIGS. 4 and 5, each of the leadout portions 93*a*3, 93*b*4, 93*c*3, and 93*d*4 has a bent shape and is disposed over one another. These leadout portions are electrically connected and constitute a terminal (e.g., a center tap). Each of the leadout portions 93*b*3 and 93*d*3 has a bent shape and is disposed over one another. These leadout portions are electrically connected and constitute a terminal. Each of the leadout portions 93*a*4 and 93*c*4 has a bent shape and is disposed over one another. These leadout portions are electrically connected and constitute a terminal.

As shown in FIG. 3, the projecting portions **93*a*5 to 93*d*5 are formed at outer edges of the flat coils 93*a* to 93*d* respectively. The flat coil 93*a* includes two projecting portions 93*a*5. These projecting portions 93*a*5 prevent the flat coil 93*a* from rotating (being misaligned) when the flat coil 93*a* is disposed in the second bobbin 20 (an accommodation groove 220*a* shown in FIG. 4). The projecting portions 93*b*5, 93*c*5, and 93*d*5 have the same structure and the same function as the projecting portions 93*a*5. This means that the projecting portions 93*b*5 to 93*d*5 prevent the flat coils 93*b* to 93*d* from rotating (being misaligned) when the flat coils 93*b* to 93*d* are disposed in the second bobbin 20 (accommodation grooves 220*b* to 220*d* shown in FIG. 4**).

Each of the protruding end portions **93*a*6 has a protruding shape and is formed at an edge of the flat coil 93*a* in the positive direction of the X-axis, i.e., opposite the leadout portions 93*a*3 and 93*a*4 in the X-axis direction. The flat coil 93*a* includes two protruding end portions 93*a*6, which are disposed in close proximity to a third side 45*c* (FIG. 2) of the case 40. These protruding end portions 93*a*6 are disposed with a predetermined distance in between in the Y-axis direction. The protruding end portions 93*a*6 enhance heat dissipation of the flat coil 93*a* and prevent the flat coil 93*a* from rotating. The protruding end portions 93*b*6 to 93*d*6 have the same structure and the same functions as the protruding end portions 93*a*6**.

As shown in FIG. 2, the case 40 accommodates the first bobbin 10, the second bobbin 20, the cores **30*a* to 30*c*, etc. The case 40 is made of, for example, a metal (e.g., aluminum) with excellent coolability. For example, the case 40 is formed by bend-shaping a metal plate. The case 40 includes a case body 41 having an opening (open side) 42**.

The case body 41 is made up of a housing having one open side. The case body 41 accommodates the first bobbin 10, the second bobbin 20, the cores **30*a* to 30*c*, etc. Except at the opening 42, the case body 41 covers the first bobbin 10, the second bobbin 20, the cores 30*a* to 30*c*, etc. The case body 41 can be filled with a potting resin 100 (FIG. 1A). The potting resin 100 is a heat dissipating resin and is made from a resin, such as a silicone resin, a urethane resin, and an epoxy resin. The case body 41 includes a case bottom 43, a case top 44, and a case side 45**.

The case bottom 43 has a substantially rectangular shape and is disposed substantially parallel to the mounting substrate (mounting surface) not shown in the drawings. Under the case bottom 43, for example, a foundation having a cooling mechanism is disposed. The case bottom 43 is fixed to the mounting substrate or so with fasteners (e.g., screws), other fixing members, or other adhesive materials. At corners of the case bottom 43, fastener holes for joining the fasteners may be formed.

The case top 44 is formed to face the case bottom 43 and is disposed substantially parallel to the case bottom 43. The case side 45 includes a first side **45*a*, a second side 45*b*, and the third side 45*c*. The first side 45*a*, the second side 45*b*, and the third side 45*c* extend upwards from three sides of the case bottom 43 at its outer edge. At the remaining side of the case bottom 43 at its outer edge, the case side 45 is not formed. The lower end of the case side 45 is connected to the case bottom 43. The upper end of the case side 45 is connected to the case top 44**.

At the edge of the second side **45*b* in the negative direction of the X-axis, for example, a wire protecting member 96 made from an insulating material is attached. As explained later, the leadout portions of the first coil 91 and the second coil 92 are drawn outwards in the Y-axis direction in the vicinity of the opening 42. The wire protecting member 96 is used for preventing the leadout portions of the first coil 91 and the second coil 92 from being damaged by touching the edge of the second side 45*b*** in the negative direction of the X-axis.

The opening 42 is provided at a location corresponding to the side where the case side 45 is not formed. The case 40 is provided with only one opening 42. The opening 42 is provided for the case body 41 at a location where the leadout portions of the first coil 91 and the second coil 92 are drawn outwards from the case 40 (FIG. 1A). The opening (open side) 42 is opened laterally on the case body 41 only in one direction (the negative direction of the X-axis).

As details will be explained later, part of the first bobbin 10 and part of the second bobbin 20 protrude laterally from the opening 42. Additionally, the leadout portions of the first coil 91 and the second coil 92 and the leadout portions of the flat coils **93*a* to 93*d* protrude laterally from the opening 42**.

Figure 1B:
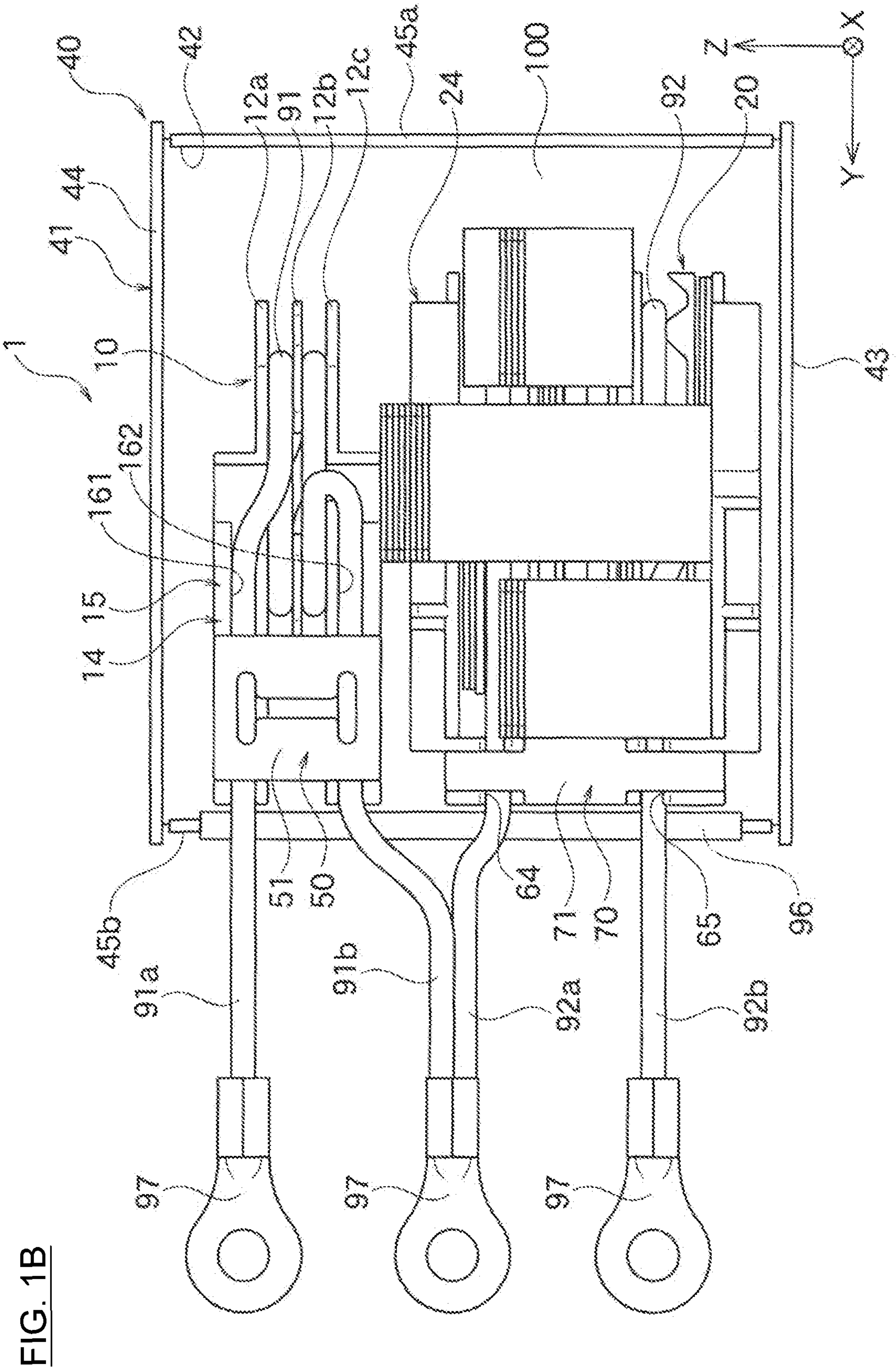
FIG. 1B is a side elevational view of the coil device shown in FIG. 1A viewed from direction IA.

As shown in FIGS. 1A and 1B, when the first bobbin 10 and the second bobbin 20 are accommodated in the case body 41, the case top 44 of the case body 41 is disposed above the first bobbin 10 so as to cover the first bobbin 10 from above; and the case bottom 43 of the case body 41 is disposed under the second bobbin 20 so as to cover the second bobbin 20 from below. With the case bottom 43 and the case top 44, the case body 41 covers the first bobbin 10 and the second bobbin 20 having the cores **30*a* to 30*c***, etc. from above and from below.

With the case bottom 43, the case top 44, and the case side 45, the case body 41 covers the first bobbin 10 and the second bobbin 20 having the cores **30*a* to 30*c***, etc. from five directions including from above and from below.

Preferably, a clearance is provided between the case top 44 of the case body 41 and an upper end part of the first bobbin 10 or an upper end part of the core **30*a* (a base 31*a*) attached to the first bobbin 10. A lower end part of the second bobbin 20 or a lower end part of the core 30*c* (a base 31*c*) attached to the second bobbin 20 may touch the case bottom 43 of the case body 41**.

As shown in FIG. 2, each of the cores **30*a* to 30*c* is an E-shaped core having a substantially identical shape. The cores 30*a* to 30*c* may be made from any magnetic materials, such as metal and ferrite. The core 30*a* includes the base 31*a*, a pair of outer legs 32*a*, and a middle leg 33*a* and is attached to the first bobbin 10 from above. The core 30*b* includes a base 31*b*, a pair of outer legs 32*b*, and a middle leg 33*b* and is attached to the second bobbin 20 from above. The core 30*c* includes the base 31*c*, a pair of outer legs 32*c*, and a middle leg 33*c* and is attached to the second bobbin 20** from below.

Each of the bases **31*a* to 31*c* has a flat shape with a predetermined thickness. The widths of the bases 31*a* to 31*c* in the X-axis direction decrease towards their respective centers in the Y-axis direction. On the upper surface of the base 31*b*, a separation sheet 95 made from an insulating material is disposed. The core 30*b* is attached to the first bobbin 10 from below with the separation sheet 95 provided between the core 30*b* and the first bobbin 10**.

One of the pair of outer legs **32*a* protrudes downwards from one end of the base 31*a* in the Y-axis direction. The other one of the pair of outer legs 32*a* protrudes downwards from the other end of the base 31*a* in the Y-axis direction. Similarly, one of the pair of outer legs 32*b* protrudes downwards from one end of the base 31*b* in the Y-axis direction. The other one of the pair of outer legs 32***b* protrudes downwards from the other end of the base 31*b* in the Y-axis direction.

One of the pair of outer legs 32*c* protrudes upwards from one end of the base 31*c* in the Y-axis direction. The other one of the pair of outer legs 32*c* protrudes upwards from the other end of the base 31*c* in the Y-axis direction. Inner surfaces (facing the middle legs 33*a* to 33*c*) of the outer legs 32*a* to 32*c* are curved to run along the circumferential direction of the middle legs 33*a* to 33*c*.

Each of the middle legs 33*a* to 33*c* has a cylindrical shape. The middle legs 33*a* to 33*c* are formed at the centers of the bases 31*a* to 31*c* in the Y-axis direction respectively. The middle legs 33*a* and 33*b* protrude downwards from the centers of the bases 31*a* and 31*b* in the Y-axis direction respectively. The middle leg 33*c* protrudes upwards from the center of the base 31*c* in the Y-axis direction.

Figure 6:
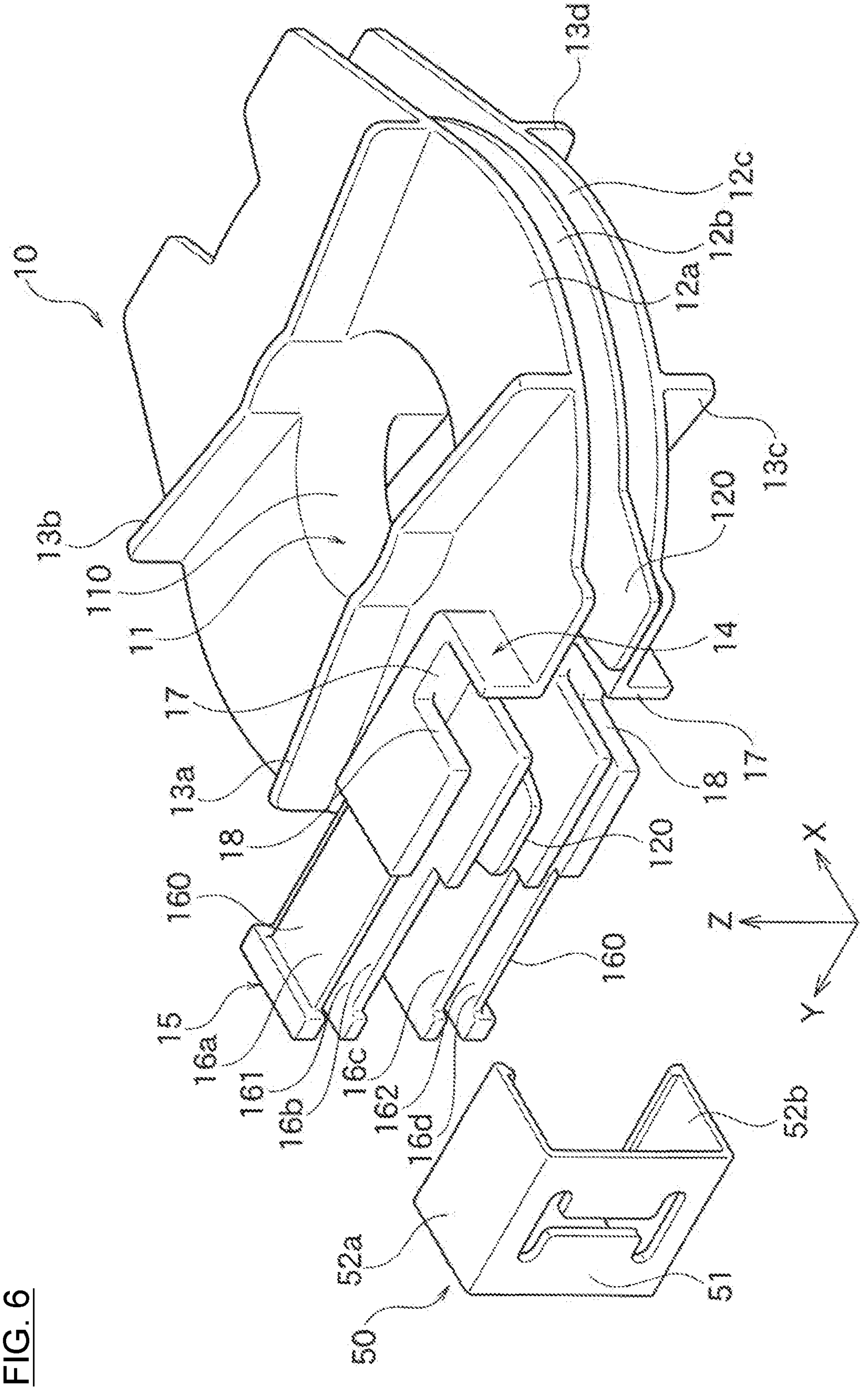
FIG. 6 is a perspective view of a first bobbin shown in FIG. 2 and a first stopper to be attached thereto.

As shown in FIG. 6, the first bobbin 10 is made from an insulating material and includes a cylindrical portion 11, flanges 12*a* to 12*c*, core fixing portions 13*a* to 13*d*, and a protrusion 14. The cylindrical portion 11 is tubular and has a through-hole 110. The middle leg 33*a* (FIG. 2) of the core 30*a* is inserted into the through-hole 110 from above.

Figure 7:
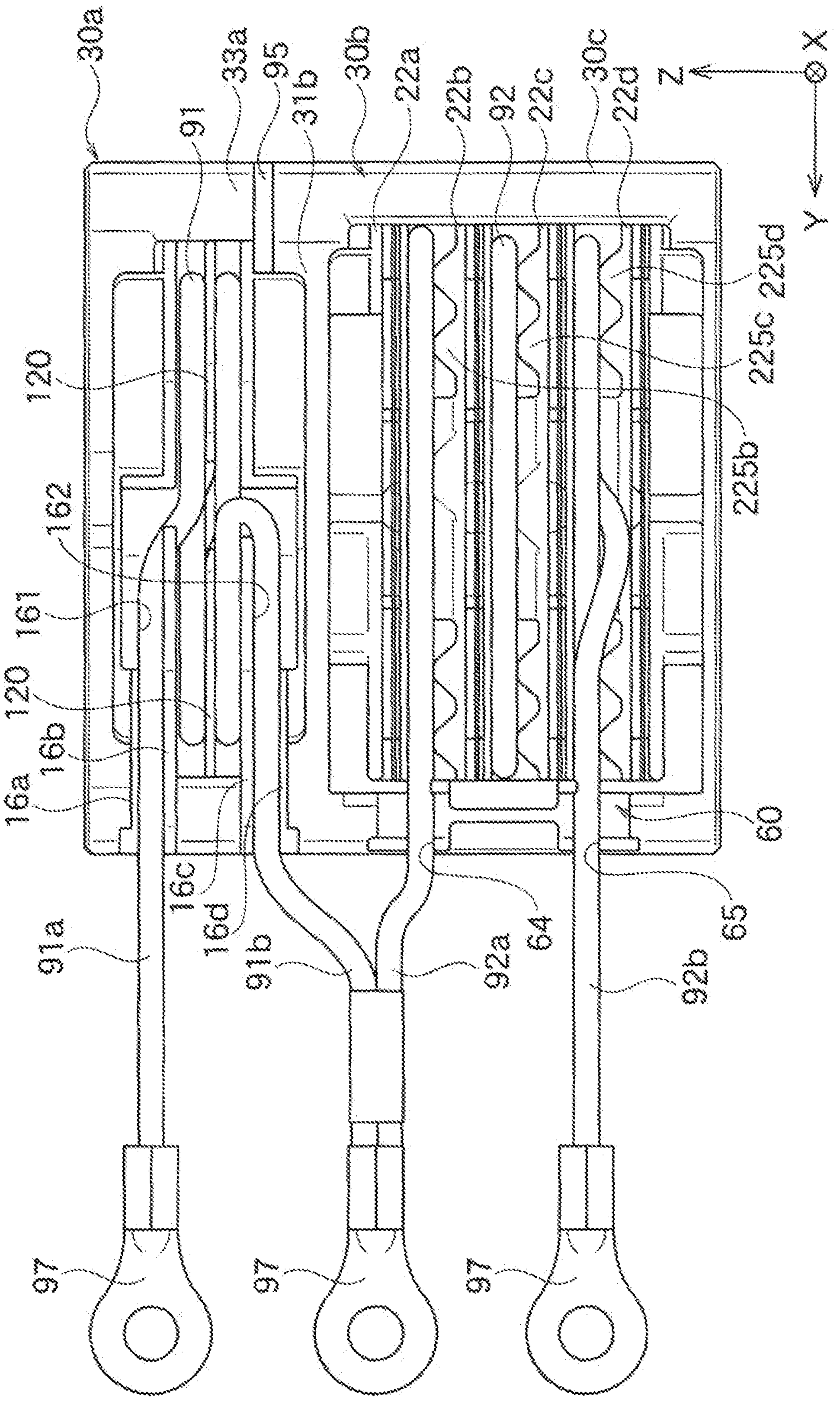
FIG. 7 is a side elevational view of windings of a first coil and a second coil shown in FIG. 1B.

The flanges 12*a* to 12*c* extend radially outwards from an outer circumferential surface of the cylindrical portion 11. The flange 12*a* is formed at an upper end of the cylindrical portion 11, and the flange 12*c* is formed at a lower end of the cylindrical portion 11. The flange 12*b* is formed between the flanges 12*a* and 12*c*. In the space between the flanges 12*a* and 12*b* and the space between the flanges 12*b* and 12*c*, the first coil 91 wound around the outer circumferential surface of the cylindrical portion 11 is disposed (FIG. 7). Note that, although only one turn of the first coil 91 is disposed in each space, two or more turns of the first coil 91 may be disposed.

An end of the flange 12*a* in the positive direction of the X-axis is provided with a cutout. The flanges 12*b* and 12*c* may be provided with a similar cutout. This cutout functions as, for example, a passage through which the potting resin 100 (FIG. 1B) filled into the case 40 flows.

On the upper surface of the flange 12*a*, the core fixing portions 13*a* and 13*b* protruding upwards are formed. The core fixing portions 13*a* and 13*b* are provided so that they run along the periphery of the base 31*a* of the core 30*a* (FIG. 2) fixed to the upper surface of the flange 12*a*, and are used for positioning the base 31*a*.

Similarly, on the lower surface of the flange 12*c*, the core fixing portions 13*c* and 13*d* protruding downwards are formed. The core fixing portions 13*c* and 13*d* are provided so that they run along the periphery of the base 31*b* of the core 30*b* (FIG. 2) fixed to the lower surface of the flange 12*c*, and are used for positioning the base 31*b*.

The protrusion 14 is formed at an end (a peripheral end) of the first bobbin 10 in the negative direction of the X-axis. As shown in FIGS. 1A and 1B, the protrusion 14 protrudes or is exposed from the case body 41 through the opening 42 laterally in the X-axis direction when the first bobbin 10 is accommodated in the case body 41. As mentioned above, the case 40 has only one opening 42, through which the protrusion 14 can protrude. Thus, the protrusion 14 protrudes in one direction (the negative direction of the X-axis) from the case body 41 through the opening 42. As shown in FIG. 5, part of the first bobbin 10 that is located more to the negative direction of the X-axis with respect to an imaginary line L (corresponding to the position of the opening (open side) 42) protrudes as the protrusion 14 from the case body 41.

As shown in FIG. 6, the protrusion 14 includes a guide portion 15 and partitioning walls 17. The partitioning walls 17 are formed on the upper surface of the flange 12*a* and the lower surface of the flange 12*c*. Each of the partitioning walls 17 includes a substantially L-shaped wall. The partitioning wall 17 on the upper surface of the flange 12*a* protrudes upwards and supports supplementary flanges 16*a* and 16*b* (explained later). The partitioning wall 17 on the lower surface of the flange 12*c* protrudes downwards and supports supplementary flanges 16*c* and 16*d* (explained later).

The guide portion 15 guides the leadout portions 91*a* and 91*b* (FIG. 7) of the first coil 91 drawn out from the first bobbin 10 towards a predetermined direction. More specifically, the guide portion 15 guides the leadout portions 91*a* and 91*b* drawn out laterally from the case body 41 through the opening 42 outwards in the Y-axis direction (away from the first bobbin 10) in the vicinity of the opening 42 (FIG. 1B).

The guide portion 15 includes the supplementary flanges 16*a* to 16*d*. The supplementary flanges 16*a* to 16*d* are disposed parallel to each other and protrude outwards in the Y-axis direction. The supplementary flanges 16*a* to 16*d* protrude in the same direction as the leadout portions 91*a* and 91*b* are drawn out. The supplementary flanges 16*a* to 16*d* protrude in one direction along the Y-axis (the positive direction of the Y-axis) and extend along the longitudinal direction of the core 30*a* (FIG. 2). The supplementary flanges 16*a* to 16*d* also extend in a direction parallel to the case bottom 43 or the case top 44, in the vicinity of the opening 42 (FIG. 1B) of the case 40.

The supplementary flanges 16*a* and 16*b* are connected to the partitioning wall 17 on the upper surface of the flange 12*a*. The supplementary flange 16*a* is formed at an upper end of the partitioning wall 17, and the supplementary flange 16*b* is formed at a lower end of the partitioning wall 17. The supplementary flanges 16*a* and 16*b* are disposed parallel to each other with a predetermined distance in between in the Z-axis direction. Between the supplementary flanges 16*a* and 16*b*, a guide path 161 through which the leadout portion 91*a* passes is provided. Drawing out the leadout portion 91*a* along the guide path 161 can guide the leadout portion 91*a* outwards in the Y-axis direction (FIG. 7).

The supplementary flanges 16*c* and 16*d* are connected to the partitioning wall 17 on the lower surface of the flange 12*c*. The supplementary flange 16*c* is formed at an upper end of the partitioning wall 17, and the supplementary flange 16*d* is formed at a lower end of the partitioning wall 17. The supplementary flanges 16*c* and 16*d* are disposed parallel to each other with a predetermined distance in between in the Z-axis direction. Between the supplementary flanges 16*c* and 16*d*, a guide path 162 through which the leadout portion 91*b* passes is provided. Drawing out the leadout portion 91*b* along the guide path 162 can guide the leadout portion 91*b* outwards in the Y-axis direction (FIG. 7).

Between the supplementary flanges 16*b* and 16*c*, an extended flange portion 120 of the flange 12*b* is disposed. As shown in FIG. 7, the extended flange portion 120 separates first and second layers of the first coil 91. The guide path 161 is located above the first layer of the first coil 91, and the leadout portion 91*a* passes outwards in the Y-axis direction above the first layer of the first coil 91. The guide path 162 is located below the second layer of the first coil 91, and the leadout portion 91*b* passes outwards in the Y-axis direction below the second layer of the first coil 91.

As shown in FIG. 6, a step 160 is formed on the upper surface of the supplementary flange 16*a*. Similarly, a step 160 is formed on the lower surface of the supplementary flange 16*d*. On the steps 160, a first stopper 50 is fixed. The first stopper 50 includes a body 51 and a pair of fixing portions 52*a* and 52*b*. The fixing portion 52*a* is formed at an upper end of the body 51 and protrudes in the direction orthogonal to the body 51. The fixing portion 52*b* is formed at a lower end of the body 51 and protrudes in the direction orthogonal to the body 51.

The fixing portion 52*a* is fixed to the step 160 of the supplementary flange 16*a*. The fixing portion 52*b* is fixed to the step 160 of the supplementary flange 16*d*. As shown in FIG. 1B, the body 51 covers at least part of the guide paths 161 and 162 from the direction (the X-axis direction) orthogonal to the extending direction (the Y-axis direction) of the leadout portions 91*a* and 91*b*. The body 51 can thus prevent lateral misalignment (in the X-axis direction), from the guide paths 161 and 162, of the leadout portions 91*a* and 91*b* drawn out along the guide paths 161 and 162, preventing the leadout portions 91*a* and 91*b* from falling off the guide paths 161 and 162.

As shown in FIG. 6, each of the supplementary flanges 16*a* to 16*d* is provided with a cutout 18. Each cutout 18 is located at a substantially center of the first bobbin 10 in the Y-axis direction. For example, when the first coil 91 is α-wound, the wire of the first coil 91 can be disposed on the outer circumferential surface of the cylindrical portion 11 through each cutout 18 for the wire to be wound around the cylindrical portion 11.

Figure 8A:
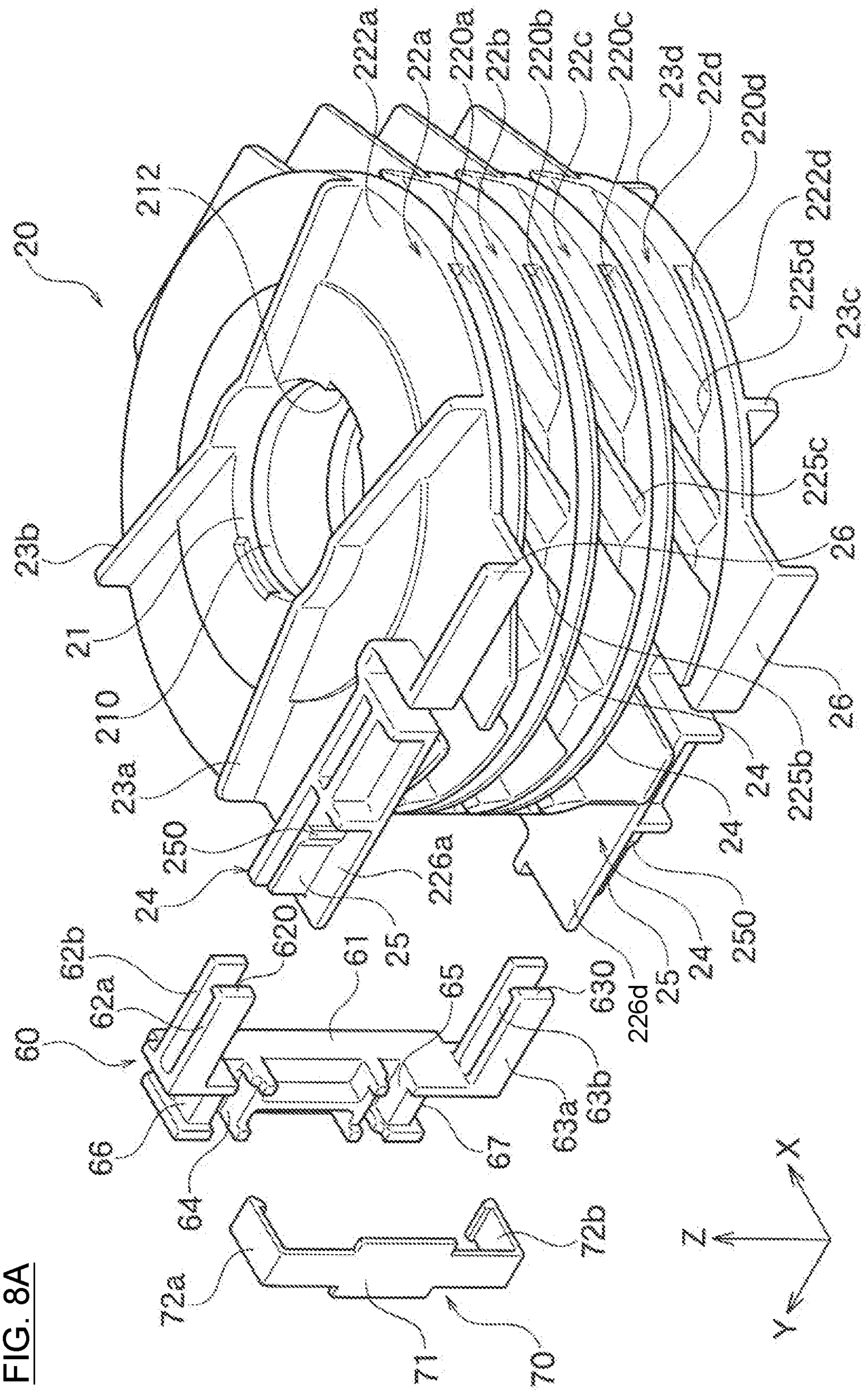
FIG. 8A is a perspective view of the second bobbin shown in FIG. 2, an attachment guide member to be attached to the second bobbin, and a second stopper to be attached to the attachment guide member.

As shown in FIG. 8A, the second bobbin 20 is made from an insulating material and includes a cylindrical portion 21, flanges 22*a* to 22*d*, core fixing portions 23*a* to 23*d*, and protrusions 24. The cylindrical portion 21 is tubular and has a through-hole 210. The middle leg 33*b* of the core 30*b* (FIG. 2) is inserted into the through-hole 210 from above, and the middle leg 33*c* of the core 30*c* is inserted into the through-hole 210 from below.

As shown in FIG. 5, the middle leg 33*a* inserted into the through-hole 110 of the first bobbin 10 and the middle legs 33*b* and 33*c* inserted into the through-hole 210 of the second bobbin 20 have different widths in the X-axis direction, namely W1 and W2 respectively. The width (W1) of the middle leg 33*a* in the X-axis direction is larger than the width (W2) of the middle legs 33*b* and 33*c* in the X-axis direction. In this case, the magnetic properties of the coil device 1 can be adjusted in accordance with the difference between the widths W1 and W2. Note that the widths W1 and W2 may be the same.

As shown in FIG. 8A, the flanges 22*a* to 22*d* extend radially outwards from an outer circumferential surface of the cylindrical portion 21. The flanges 22*a* to 22*d* may have any shape. Each of the flanges 22*a* to 22*d* has a substantially circular shape viewed from the Z-axis direction. The flange 22*a* is formed at an upper end of the cylindrical portion 21, and the flange 22*d* is formed at a lower end of the cylindrical portion 21. The flange 22*b* is formed below the flange 22*a*, and the flange 22*c* is formed above the flange 22*d*. In the space between the flanges 22*a* and 22*b*, the space between the flanges 22*b* and 22*c*, and the space between the flanges 22*c* and 22*d*, the second coil 92 wound around the outer circumferential surface of the cylindrical portion 21 is disposed (FIG. 7). Note that, although only one turn of the second coil 92 is disposed in each space, two or more turns of the second coil 92 may be disposed.

On the upper surface of the flange 22*a*, the core fixing portions 23*a* and 23*b* protruding upwards are formed. The core fixing portions 23*a* and 23*b* are provided so that they run along the periphery of the base 31*b* of the core 30*b* (FIG. 2) fixed to the upper surface of the flange 22*a*, and are used for positioning the base 31*b*.

On the lower surface of the flange 22*d*, the core fixing portions 23*c* and 23*d* protruding downwards are formed. The core fixing portions 23*c* and 23*d* are provided so that they run along the periphery of the base 31*c* of the core 30*c* (FIG. 2) fixed to the lower surface of the flange 22*d*, and are used for positioning the base 31*c*.

Figure 8B:
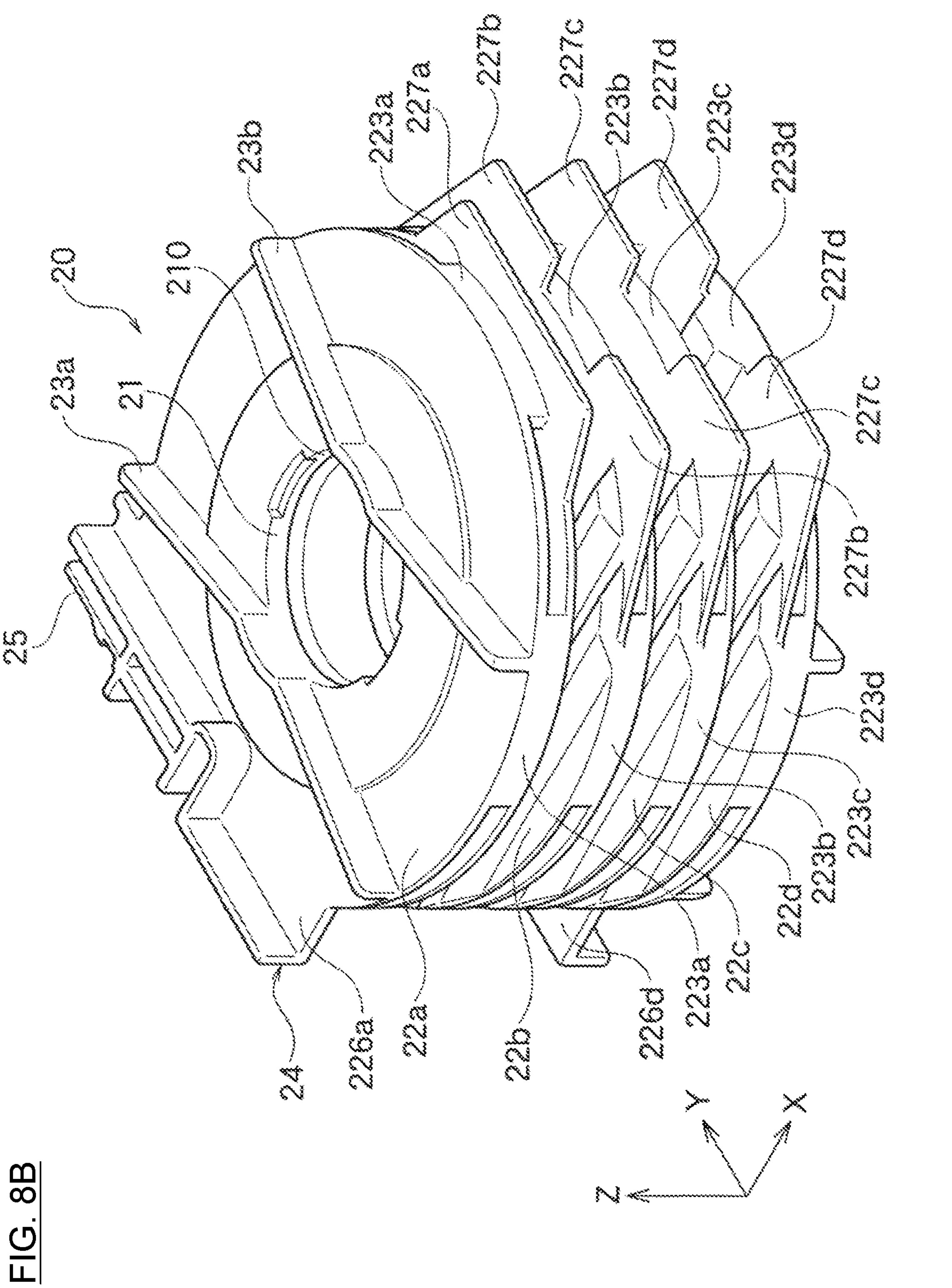
FIG. 8B is a perspective view of the second bobbin shown in FIG. 8A viewed from a different angle.

As shown in FIGS. 4 and 5, the flange 22*a* includes the accommodation groove 220*a*, an upper wall 221*a*, a lower wall 222*a*, and side walls 223*a*. The upper wall 221*a* and the lower wall 222*a* are disposed to face each other in the axial direction of the second bobbin 20. The side walls 223*a* connect outer edges of the upper wall 221*a* and the lower wall 222*a* in the Z-axis direction. The side walls 223*a* are formed at ends of the upper wall 221*a* and the lower wall 222*a* in the positive and negative directions of the Y-axis and at ends of the upper wall 221*a* and the lower wall 222*a* in the positive direction of the X-axis (FIG. 8B). The accommodation groove 220*a* is provided between the upper wall 221*a* and the lower wall 222*a* and extends along the direction orthogonal to the axial direction of the second bobbin 20.

At an end of the accommodation groove 220*a* in the negative direction of the X-axis, an insertion slot 224*a* for the flat coil 93*a* is provided. The insertion slot 224*a* is opened laterally in the X-axis direction and is located opposite one side wall 223*a* with respect to the X-axis direction. The insertion slot 224*a* is opened in the same direction as the direction in which the opening 42 of the case 40 (FIG. 2) is opened. This direction is the same as the direction orthogonal to the axial direction of the second bobbin 20. Through the insertion slot 224*a*, the flat coil 93*a* can be inserted into the accommodation groove 220*a* laterally in the X-axis direction. The flat coil 93*a* inserted into the accommodation groove 220*a* is fixed (positioned) by the side wall 223*a* at the end of the flange 22*a* in the positive direction of the X-axis.

The flanges 22*b* to 22*d* have the same structure as the flange 22*a*. The flanges 22*b* to 22*d* include the accommodation grooves 220*b* to 220*d*, upper walls 221*b* to 221*d*, lower walls 222*b* to 222*d*, and side walls 223*b* to 223*d* respectively. Through insertion slots 224*b* to 224*d*, the flat coils 93*b* to 93*d* are inserted into the accommodation grooves 220*b* to 220*d* laterally in the X-axis direction respectively. The flat coils 93*b* to 93*d* inserted into the accommodation grooves 220*b* to 220*d* are fixed (positioned) by the side walls 223*b* to 223*d* at the ends of the flanges 22*b* to 22*d* in the positive direction of the X-axis respectively.

As shown in FIG. 5, the cylindrical portion 21 is provided with cutouts 211 along its axial direction. The cutouts 211 are provided at respective locations corresponding to the accommodation grooves 220*a* to 220*d* (locations where the cylindrical portion 21 and the accommodation grooves 220*a* to 220*d* meet). Thus, at the locations corresponding to the accommodation grooves 220*a* to 220*d*, the cutouts 211 interrupt the cylindrical portion 21 in the Z-axis direction. Such a structure allows the flat coils 93*a* to 93*d* to be inserted into the accommodation grooves 220*a* to 220*d* laterally in the X-axis direction without being obstructed by the cylindrical portion 21.

As shown in FIG. 8A, the flanges 22*b* to 22*d* are provided with uneven portions 225*b* to 225*d*. The uneven portions 225*b* to 225*d* are formed on the respective upper surfaces of the upper walls 221*b* to 221*d* of the flanges 22*b* to 22*d*. Thus, the second coil 92 is disposed on the uneven portion 225*b* in the space between the flanges 22*a* and 22*b*, on the uneven portion 225*c* in the space between the flanges 22*b* and 22*c*, and on the uneven portion 225*d* in the space between the flanges 22*c* and 22*d*.

As shown in FIG. 8B, the flanges 22*a* to 22*d* are provided with flange end portions 227*a* to 227*d* respectively. The flange end portion 227*a* protrudes outwards in the X-axis direction from an end of the lower wall 222*a* (FIG. 5) of the flange 22*a* in the positive direction of the X-axis. The flange end portions 227*b* to 227*d* protrude outwards in the X-axis direction from ends of the upper walls 221*b* to 221*d* (FIG. 5) of the flanges 22*b* to 22*d* in the positive direction of the X-axis, respectively. Unlike the flange end portion 227*a*, the flange end portions 227*b* to 227*d* are bifurcated.

The flange end portion 227*a* covers from below and protects the protruding end portions 93*a*6 (FIG. 3) of the flat coil 93*a* (FIG. 5) accommodated in the accommodation groove 220*a*. The flange end portions 227*b* to 227*d* cover from above and protect the protruding end portions 93*b*6 to 93*d*6 (FIG. 3) of the flat coils 93*b* to 93*d* (FIG. 5) accommodated in the accommodation grooves 220*b* to 220*d*, respectively.

As shown in FIG. 8A, ends of the flanges 22*a* and 22*d* in the negative direction of the X-axis are provided with wide portions 226*a* and 226*d* respectively. More specifically, the wide portion 226*a* is provided widely in the Y-axis direction at the upper wall 221*a* of the flange 22*a*, and the wide portion 226*d* is provided widely in the Y-axis direction at the lower wall 222*d* of the flange 22*d*. The wide portions 226*a* and 226*d* are used for stably holding an attachment guide member 60 (explained later).

The protrusions 24 are formed at an end (a peripheral end) of the second bobbin 20 in the negative direction of the X-axis. As shown in FIGS. 1A and 1B, the protrusions 24 protrude or are exposed from the case body 41 through the opening 42 laterally in the X-axis direction when the second bobbin 20 is accommodated in the case body 41. As mentioned above, the case 40 has only one opening 42, through which the protrusions 24 can protrude. Thus, the protrusions 24 protrude through the opening 42 in one direction (the negative direction of the X-axis) from the case body 41.

As shown in FIG. 5, part of the second bobbin 20 that is located more to the negative direction of the X-axis with respect to the imaginary line L protrudes as the protrusions 24 from the case body 41. More specifically, ends of the upper wall 221*a* and the lower wall 222*a* of the flange 22*a* in the negative direction of the X-axis protrude as the protrusions 24 from the case body 41; ends of the upper wall 221*b* and the lower wall 222*b* of the flange 22*b* in the negative direction of the X-axis protrude as the protrusions 24 from the case body 41; ends of the upper wall 221*c* and the lower wall 222*c* of the flange 22*c* in the negative direction of the X-axis protrude as the protrusions 24 from the case body 41; and ends of the upper wall 221*d* and the lower wall 222*d* of the flange 22*d* in the negative direction of the X-axis protrude as the protrusions 24 from the case body 41.

Thus, the insertion slots 224*a* to 224*d* protrude laterally from the case body 41, thereby allowing the flat coils 93*a* to 93*d* to be easily inserted into the accommodation grooves 220*a* to 220*d* respectively.

Ends of the flat coils 93*a* to 93*d* in the negative direction of the X-axis or the leadout portions thereof protrude from the case body 41 through the opening 42 together with the protrusions 24. Outside the case body 41, the ends of the flat coils 93*a* to 93*d* in the negative direction of the X-axis are fixed to the protrusions 24 (upper surfaces of the lower walls 222*a* to 222*d* of the flanges 22*a* to 22*d*). This allows for prevention of misalignment of the flat coils 93*a* to 93*d* in the Z-axis direction.

As shown in FIG. 8A, the protrusions 24 include nipped portions 25 and wall portions 26. The nipped portions 25 and the wall portions 26 are formed on the upper surface of the wide portion 226*a* and the lower surface of the wide portion 226*b*. The wall portion 26 on the upper surface of the wide portion 226*a* protrudes upwards and extends from one end to the other end of the wide portion 226*a* in the Y-axis direction. The wall portion 26 on the lower surface of the wide portion 226*d* protrudes downwards and extends from one end to the other end of the wide portion 226*d* in the Y-axis direction.

The nipped portion 25 on the upper surface of the wide portion 226*a* has a plate shape protruding upwards and extends along the Y-axis direction for a predetermined length. Although detailed description is omitted, the nipped portion 25 on the lower surface of the wide portion 226*d* has a flat shape protruding downwards and extends along the Y-axis direction for a predetermined length. To these nipped portions 25, nipping portions 62*a* and 62*b* and nipping portions 63*a* and 63*b* of the attachment guide member 60 (explained later) are attached. These nipped portions 25 are provided with engaging protrusions 250 that engage with hooks 620 and 630 of the nipping portions 62*a* and 63*a*.

The attachment guide member 60 is made separately from the second bobbin 20 and is attached to the protrusions 24. Similarly to the protrusions 24, the attachment guide member 60 protrudes laterally from the case body 41. The attachment guide member 60 guides the leadout portions 92*a* and 92*b* of the second coil 92 drawn out from the second bobbin 20 towards a predetermined direction. More specifically, as shown in FIG. 7, the attachment guide member 60 guides the leadout portions 92*a* and 92*b* drawn out laterally from the case body 41 through the opening 42 outwards in the Y-axis direction (away from the second bobbin 20) in the vicinity of the opening 42 (FIG. 1B). As shown in FIG. 8A, the attachment guide member 60 includes a body 61, the nipping portions 62*a* and 62*b*, the nipping portions 63*a* and 63*b*, guide paths 64 and 65, and fixing portions 66 and 67.

The body 61 extends along the axial direction of the second bobbin 20. The pair of nipping portions 62*a* and 62*b* is formed at an upper end of the body 61 and protrudes in the direction orthogonal to the body 61. The nipping portions 62*a* and 62*b* nip the nipped portion 25 of the protrusion 24 of the flange 22*a*. At the tip of the nipping portion 62*a*, the hook 620 is formed. The hook 620 engages with the engaging protrusion 250 of the nipped portion 25.

The pair of nipping portions 63*a* and 63*b* is formed at a lower end of the body 61 and protrudes in the direction orthogonal to the body 61. The nipping portions 63*a* and 63*b* nip the nipped portion 25 of the protrusion 24 of the flange 22*d*. At the tip of the nipping portion 63*a*, the hook 630 is formed. The hook 630 engages with the engaging protrusion 250 of the nipped portion 25. The nipping portions 62*a* and 62*b* and the nipping portions 63*a* and 63*b* allow for attachment of the attachment guide member 60 to the second bobbin 20.

The guide path 64 is provided with a groove extending from one end to the other end of the body 61 in the Y-axis direction, below the nipping portions 62*a* and 62*b*. The guide path 65 is provided with a groove extending from one end to the other end of the body 61 in the Y-axis direction, above the nipping portions 63*a* and 63*b*.

As shown in FIG. 7, the leadout portions 92*a* and 92*b* pass through the guide paths 64 and 65 respectively. Drawing out the leadout portions 92*a* and 92*b* along the guide paths 64 and 65 respectively can guide the leadout portion 92*a* and 92*b* outwards in the Y-axis direction.

As shown in FIG. 8A, the fixing portion 66 is formed at the upper end of the body 61 and has a substantially flat surface. The fixing portion 67 is formed at the lower end of the body 61 and has a substantially flat surface. On the fixing portion 66, a nipping portion 72*a* of a second stopper 70 is fixed. On the fixing portion 67, a nipping portion 72*b* of the second stopper 70 is fixed.

The second stopper 70 includes a body 71 and the pair of nipping portions 72*a* and 72*b*. The body 71 extends along the extending direction of the body 61 of the attachment guide member 60. The nipping portion 72*a* is formed at an upper end of the body 71 and protrudes in the direction orthogonal to the body 71. The nipping portion 72*b* is formed at a lower end of the body 71 and protrudes in the direction orthogonal to the body 71. The nipping portions 72*a* and 72*b* are fixed to the fixing portions 66 and 67 of the attachment guide member 60 respectively so as to nip the body 61 of the attachment guide member 60. This allows the second stopper 70 to be attached to the attachment guide member 60 using the nipping portions 72*a* and 72*b*.

Figure 9:
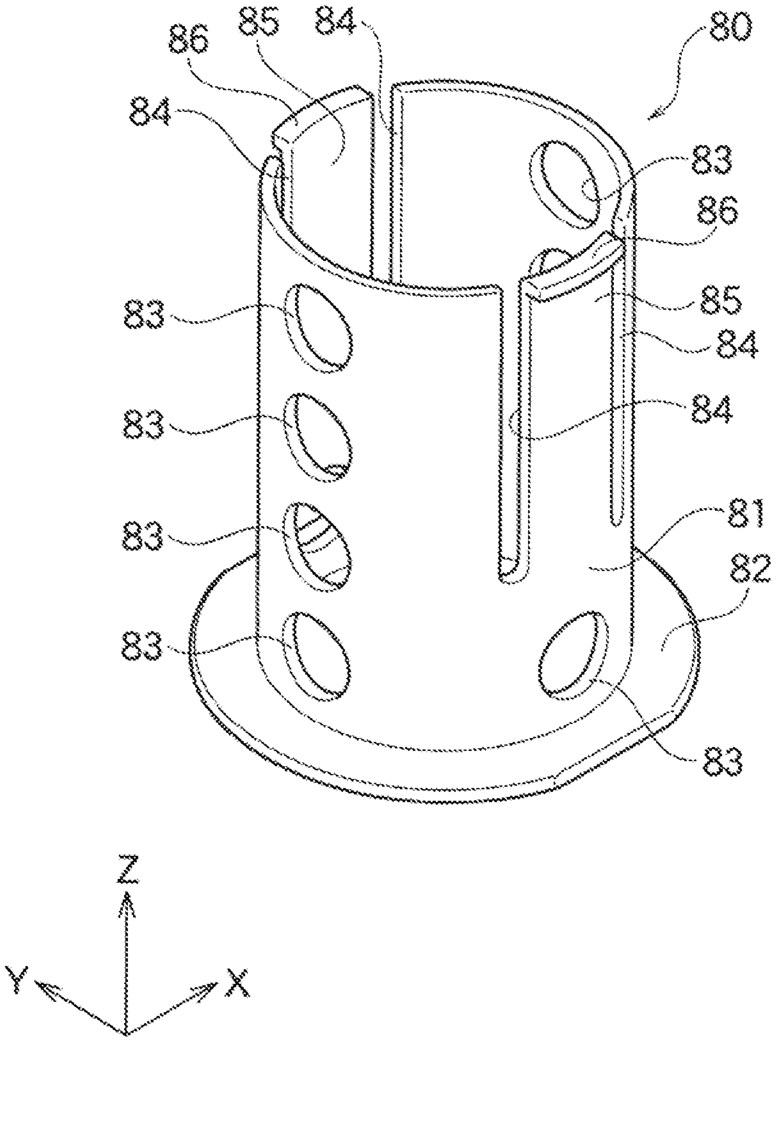
FIG. 9 is a perspective view of a retainer member to be attached to the second bobbin shown in FIG. 8A.

As shown in FIG. 9, a retainer member 80 is made from an insulating material and includes a tubular portion 81, a fixing flange 82, holes 83, grooves 84, elastic portions 85, and hooks 86. The retainer member 80 is made separately from the second bobbin 20 (FIG. 8A) and is inserted into the through-hole 210 of the second bobbin 20, for example, from below. The retainer member 80 is disposed at inner circumferential sides of the flat coils 93*a* to 93*d* (FIG. 3) when inserted into the through-hole 210.

The tubular portion 81 has a tubular shape. The upper end of the tubular portion 81 is opened, whereas the lower end of the tubular portion 81 is closed. As shown in FIG. 5, when the retainer member 80 is disposed in the through-hole 210, the middle leg 33*b* of the core 30*b* and the middle leg 33*c* of the core 30*c* are disposed inside the tubular portion 81. Thus, the tubular portion 81 is disposed between the outer circumferential surfaces of the middle legs 33*b* and 33*c* and the inner circumferential surfaces of the flat coils 93*a* to 93*d*. Note that a gap may be provided between the tip of the middle leg 33*b* of the core 30*b* and the tip of the middle leg 33*c* of the core 30*c*.

As shown in FIG. 9, the fixing flange 82 is formed at the lower end of the tubular portion 81 to form the bottom of the tubular portion 81. The fixing flange 82 protrudes radially outwards from an outer circumferential surface of the tubular portion 81. As shown in FIG. 5, the fixing flange 82 is fixed on the lower surface (the lower wall 222*d*) of the flange 22*d* of the second bobbin 20. The fixing flange 82 fixes (positions) the retainer member 80 in the through-hole 210 at a predetermined location.

As shown in FIG. 9, the holes 83 are provided on the outer circumferential surface of the tubular portion 81 and penetrate the tubular portion 81 from its inner circumferential surface to its outer circumferential surface. The tubular portion 81 may be provided with a plurality of holes 83. The holes 83 function as a passage through which the potting resin 100 filled into the case 40 (FIG. 1A) flows into the tubular portion 81.

The grooves (slits) 84 extend downwards from the upper end of the tubular portion 81. The tubular portion 81 is provided with pairs of grooves 84 at a plurality of locations. Each of the elastic portions 85 is provided between one groove 84 and the other groove 84 of each pair. Because each of the elastic portions 85 has a relatively small width, the elastic portion 85 has elasticity (flexibility or deformability). Thus, when the retainer member 80 is inserted into the through-hole 210 of the second bobbin 20 (FIG. 5), elastic deformation of the elastic portions 85 occurs, allowing the retainer member 80 to be easily inserted into the through-hole 210.

The hooks 86 are formed at upper ends of the respective elastic portions 85 and protrude radially outwards from the tubular portion 81. The hooks 86 engage with engaging recesses 212 (FIG. 8A) at the upper end of the cylindrical portion 21.

Next, a method of manufacturing the coil device 1 will be explained. First, the components shown in FIG. 2 are prepared. Then, the cores 30*a* and 30*b* are attached to the first bobbin 10. Note that the separation sheet 95 is provided between the first bobbin 10 and the core 30*b* attached thereto. The cores 30*b* and 30*c* are attached also to the second bobbin 20.

Next, a wire is wound around the cylindrical portion 11 of the first bobbin 10 to give the first coil 91. Another wire is wound around the cylindrical portion 21 of the second bobbin 20 to give the second coil 92. As shown in FIG. 5, the flat coils 93*a* to 93*d* are inserted into the accommodation grooves 220*a* to 220*d* laterally in the X-axis direction through the insertion slots 224*a* to 224*d* respectively. Preferably, the flat coils 93*a* to 93*d* are inserted into the accommodation grooves 220*a* to 220*d* respectively after the second coil 92 is formed.

Next, the first bobbin 10 and the second bobbin 20 with the cores 30*a* to 30*c*, etc. are accommodated in the case 40 shown in FIG. 2. To the second side 45*b* of the case body 41, the wire protecting member 96 is attached. Then, the case body 41 is filled with the potting resin 100, and the potting resin 100 is hardened.

Next, as shown in FIGS. 1B and 7, the leadout portions 91*a* and 91*b* of the first coil 91 are drawn out from the case body 41 through the opening 42 laterally in the X-axis direction. The leadout portions 91*a* and 91*b* of the first coil 91 are drawn out along the guide paths 161 and 162 of the guide portion 15 outwards in the Y-axis direction from the case body 41. Then, the first stopper 50 is attached to the guide portion 15.

The leadout portions 92*a* and 92*b* of the second coil 92 are drawn out from the case body 41 through the opening 42 laterally in the X-axis direction. The attachment guide member 60 is attached to the second bobbin 20, and the leadout portions 92*a* and 92*b* of the second coil 92 are drawn out along the guide paths 64 and 65 of the attachment guide member 60 outwards in the Y-axis direction from the case body 41. Then, the second stopper 70 is attached to the attachment guide member 60. The above process can give the coil device 1.

As explained above, in the present embodiment, the case body 41 covers the first bobbin 10 and the second bobbin 20 with the cores 30*a* to 30*c* (FIG. 2) from above and from below as shown in FIG. 1A. Thus, not only lower part of the first bobbin 10, the second bobbin 20, etc. but also upper part thereof is covered with the case, and most part of the first bobbin 10, the second bobbin 20, etc. is immersed in the potting resin 100. As a result, not only the heat of the lower part of the first bobbin 10, the second bobbin 20, etc. but also the heat of the upper part thereof is transferred through the potting resin 100 from upper part to lower part of the case body 41 and further from the case bottom 43 of the case body 41 to the cooling mechanism or the like. Thus, high heat dissipation ability of the device can be achieved as a whole, thereby allowing the coil device 1 to have excellent cooling capability.

In the present embodiment, the leadout portions 91*a* and 91*b* of the first coil 91 and the leadout portions 92*a* and 92*b* of the second coil 92 can be drawn out from the case body 41 laterally and outwards through the opening 42. This reduces the heights of the first bobbin 10 and the second bobbin 20, allowing the height of the coil device 1 to be reduced.

In the present embodiment, the leadout portions 91*a* and 91*b* drawn out from the case body 41 through the opening 42 laterally in the X-axis direction can be drawn out (routed) outwards in the Y-axis direction while being fixed to (engaged with) the protrusion 14 (FIG. 6). Similarly, the leadout portions 92*a* and 92*b* drawn out from the case body 41 through the opening 42 laterally in the X-axis direction can be drawn out (routed) outwards in the Y-axis direction while being fixed to (engaged with) the attachment guide member 60 (FIG. 8A). This determines the locations, the drawing-out direction, etc. of the leadout portions 91*a*, 91*b*, etc., allowing for sufficiently high lead-out accuracy of the leadout portions 91*a*, 91*b*, etc.

In the present embodiment, because the case 40 is solely provided with the opening 42, the case body 41 can be filled with the potting resin 100 provided through the opening 42, and the potting resin 100 can be held in the case body 41 securely. Also, because the protrusion 14 protrudes in only one direction (the negative direction of the X-axis) from the case body 41, the coil device 1 can have a smaller size compared to when the protrusion 14 protrudes in a plurality of directions.

As shown in FIG. 1B, drawing out the leadout portions 91*a* and 91*b* guided by the guide portion 15 outwards in the Y-axis direction outside the case body 41 can determine the drawing-out direction of the leadout portions 91*a* and 91*b*, allowing for sufficient increase of the lead-out accuracy of the leadout portions 91*a* and 91*b*.

Drawing out the leadout portions 91*a* and 91*b* along the guide paths 161 and 162 outside the case body 41 allows the leadout portions 91*a* and 91*b* to be drawn out in the vicinity of the opening 42 (i.e., not at a location away from the case 40), allowing for effective reduction of the size of the coil device 1. Misalignment of the leadout portions 91*a* and 91*b* can also be prevented.

In the present embodiment, the attachment guide member 60 can be attached to the protrusions 24 after the second coil 92 is wound around the second bobbin 20, as shown in FIGS. 7 and 8A. This can prevent obstruction by the attachment guide member 60 when the second coil 92 is wound around the second bobbin 20. Drawing out the leadout portions 92*a* and 92*b* guided by the attachment guide member 60 outwards in the Y-axis direction outside the case body 41 can determine the drawing-out direction of the leadout portions 92*a* and 92*b*, allowing for sufficient increase of the lead-out accuracy of the leadout portions 92*a* and 92*b*.

The present invention is not limited to the above-mentioned embodiment and can variously be modified within the scope of the present invention.

In the description of the above-mentioned embodiment, an example of applying the present invention to a transformer has been explained. However, the present invention can be applied not only to the transformer but also to other coil devices.

As shown in FIG. 2, in the above-mentioned embodiment, the bobbins include two bobbins, namely the first bobbin 10 and the second bobbin 20. However, the bobbins may include only one bobbin. Alternatively, the bobbins of the coil device 1 may include three or more bobbins. The first bobbin 10 is not essential and may be, together with the first coil 91, omitted from the coil device 1.

As shown in FIGS. 1A and 1B, in the above-mentioned embodiment, the first bobbin 10 and the second bobbin 20 are accommodated in the case 40 so that their axes are substantially orthogonal to the mounting surface. However, the first bobbin 10 and the second bobbin 20 may be accommodated in the case 40 so that their axes are substantially parallel to the mounting surface.

As shown in FIG. 2, in the above-mentioned embodiment, the case 40 is provided with only one opening 42. However, the case 40 may be provided with two or more openings 42.

In the above-mentioned embodiment, the coil device 1 is provided with the two types of coils, namely the coils (FIG. 7) made of the wires and the flat coils (FIG. 3). However, the coil device 1 may be provided with only one of the two types of coils.

As shown in FIG. 4, in the above-mentioned embodiment, the second bobbin 20 is structured so that the flat coils 93*a* to 93*d* can be laterally inserted into the accommodation grooves 220*a* to 220*d* through the insertion slots 224*a* to 224*d*. However, the second bobbin 20 may have any structure. For example, the second bobbin 20 may have a structure including a plurality of sections, between which the flat coils 93*a* to 93*d* can be disposed.

NUMERICAL REFERENCES

1 . . . coil device
10 . . . first bobbin
11 . . . cylindrical portion
110 . . . through-hole
12*a* to 12*c* . . . flange
120 . . . extended flange portion
13*a* to 13*d* . . . core fixing portion
14 . . . protrusion
15 . . . guide portion
16*a* to 16*d* . . . supplementary flange
160 . . . step
161, 162 . . . guide path
17 . . . partitioning wall
18 . . . cutout
20 . . . second bobbin
21 . . . cylindrical portion
210 . . . through-hole
211 . . . cutout
212 . . . engaging recess
22*a* to 22*d* . . . flange
220*a* to 220*d* . . . accommodation groove
221*a* to 221*d* . . . upper wall
222*a* to 222*d* . . . lower wall
223*a* to 223*d* . . . side wall
224*a* to 224*d* . . . insertion slot
225*b* to 225*d* . . . uneven portion
226*a*, 226*d* . . . wide portion
227*a* to 227*d* . . . flange end portion
23*a* to 23*d* . . . core fixing portion
24 . . . protrusion
25 . . . nipped portion
250 . . . engaging protrusion
26 . . . wall portion
30*a* to 30*c* . . . core
31*a* to 31*c* . . . base
32*a* to 32*c* . . . outer leg

33a to 33c . . . middle leg
40 . . . case
41 . . . case body
42 . . . opening
43 . . . case bottom
44 . . . case top
45 . . . case side
50 . . . first stopper
51 . . . body
52a, 52b . . . fixing portion
60 . . . attachment guide member
61 . . . body
62a, 62b, 63a, 63b . . . nipping portion
620, 630 . . . hook
64, 65 . . . guide path
66, 67 . . . fixing portion
70 . . . second stopper
71 . . . body
72a, 72b . . . nipping portion
80 . . . retainer member
81 . . . tubular portion
82 . . . fixing flange
83 . . . hole
84 . . . groove
85 . . . elastic portion
86 . . . hook
91 . . . first coil
92 . . . second coil
93a, 93b, 93c, 93d . . . flat coil
93a1, 93a2, 93b1, 93b2, 93c1, 93c2, 93d1, 93d2 . . . sheet
93a3, 93a4, 93b3, 93b4, 93c3, 93c4, 93d3, 93d4 . . . leadout portion
93a5, 93b5, 93c5, 93d5 . . . projecting portion
93a6, 93b6, 93c6, 93d6 . . . protruding end portion
95 . . . separation sheet
96 . . . wire protecting member
97 . . . terminal
100 . . . potting resin

What is claimed is:

1. A coil device comprising:
a bobbin provided with a coil;
a core attached to the bobbin;
a case accommodating the bobbin and the core; and
a heat dissipating resin filling the case;
wherein
the case comprises a case body covering the bobbin with the core from above and from below and having an opening that is opened laterally;
the bobbin comprises a protrusion protruding from the case body through the opening;
the protrusion comprises a guide portion that guides a leadout portion of the coil towards a predetermined direction; and
when viewed in a direction perpendicular to the opening, the leadout portion passes through the guide portion along a direction perpendicular to both an axial direction of the bobbin and a protruding direction of the protrusion.

2. The coil device according to claim 1, wherein
the case body covers the bobbin except at the opening; and
the protrusion protrudes in one direction from the case body through the opening.

3. The coil device according to claim 1, wherein
the guide portion comprises a guide path extending in the vicinity of the opening and parallel to a bottom surface of the case.

4. The coil device according to claim 3, wherein
a stopper is attached to the guide portion; and
the stopper covers at least part of the guide path from a direction substantially orthogonal to an extending direction of the leadout portion.

5. The coil device according to claim 1, wherein
the guide portion made separately from the bobbin is attached to the protrusion.

6. The coil device according to claim 1, wherein
the coil comprises a first coil including a first wire and a second coil including a second wire;
the bobbin comprises a first bobbin provided with the first coil and a second bobbin provided with the second coil;
the first bobbin comprises a first protrusion protruding from the case body through the opening; and
the second bobbin comprises a second protrusion protruding from the case body through the opening.

7. The coil device according to claim 2, wherein
the coil comprises a first coil including a first wire and a second coil including a second wire;
the bobbin comprises a first bobbin provided with the first coil and a second bobbin provided with the second coil;
the first bobbin comprises a first protrusion protruding from the case body through the opening; and
the second bobbin comprises a second protrusion protruding from the case body through the opening.

8. The coil device according to claim 1, wherein
the coil comprises a flat coil having a flat wire; and
a leadout portion of the flat coil protrudes from the case body through the opening and is fixed to the protrusion.

9. A coil device comprising:
a bobbin provided with a coil;
a core attached to the bobbin;
a case accommodating the bobbin and the core; and
a heat dissipating resin filling the case;
wherein
the case comprises a case body covering the bobbin with the core from above and from below and having an opening that is opened laterally;
the bobbin comprises a protrusion protruding from the case body through the opening;
the coil comprises a first coil including a first wire and a second coil including a second wire;
the bobbin comprises a first bobbin provided with the first coil and a second bobbin provided with the second coil;
the first bobbin comprises a first protrusion protruding from the case body through the opening; and
the second bobbin comprises a second protrusion protruding from the case body through the opening.

10. A coil device comprising:
a bobbin provided with a coil;
a core attached to the bobbin;
a case accommodating the bobbin and the core; and
a heat dissipating resin filling the case;
wherein
the case comprises a case body covering the bobbin with the core from above and from below and having an opening that is opened laterally;
the bobbin comprises a protrusion protruding from the case body through the opening;
the case body covers the bobbin except at the opening;
the protrusion protrudes in one direction from the case body through the opening;
the coil comprises a first coil including a first wire and a second coil including a second wire;
the bobbin comprises a first bobbin provided with the first coil and a second bobbin provided with the second coil;

the first bobbin comprises a first protrusion protruding from the case body through the opening; and the second bobbin comprises a second protrusion protruding from the case body through the opening.

* * * * *